(12) United States Patent
Wagman et al.

(10) Patent No.: US 10,447,079 B2
(45) Date of Patent: Oct. 15, 2019

(54) MULTI-COIL INDUCTION

(71) Applicant: Apple Inc., Cupertino, CA (US)

(72) Inventors: Daniel C. Wagman, Santa Cruz, CA (US); Eric S. Jol, Cupertino, CA (US); Paul J. Thompson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1063 days.

(21) Appl. No.: 14/256,628

(22) Filed: Apr. 18, 2014

(65) Prior Publication Data

US 2015/0303699 A1    Oct. 22, 2015

(51) Int. Cl.

| | |
|---|---|
| *H01F 27/42* | (2006.01) |
| *H01F 37/00* | (2006.01) |
| *H01F 38/00* | (2006.01) |
| *H02J 50/10* | (2016.01) |
| *H02J 5/00* | (2016.01) |
| *H02J 50/90* | (2016.01) |
| *H02J 50/70* | (2016.01) |
| *H02J 7/02* | (2016.01) |
| *H02J 50/40* | (2016.01) |

(52) U.S. Cl.
CPC .............. *H02J 50/10* (2016.02); *H02J 5/005* (2013.01); *H02J 7/025* (2013.01); *H02J 50/40* (2016.02); *H02J 50/70* (2016.02); *H02J 50/90* (2016.02)

(58) Field of Classification Search
CPC .. H02J 5/005; H02J 50/10; H02J 50/90; H02J 50/70; H02J 7/025; H02J 50/40
USPC .......................................................... 307/104
See application file for complete search history.

(56) References Cited

U.S. PATENT DOCUMENTS

| | | | |
|---|---|---|---|
| 2,471,869 | A | 5/1949 | Gebel |
| 3,676,814 | A | 7/1972 | Trunzo et al. |
| 4,496,927 | A | 1/1985 | Inoue |
| 4,529,906 | A | 7/1985 | McMahon |
| 5,903,134 | A | 5/1999 | Takeuchi et al. |
| 6,798,039 | B1 | 9/2004 | Gillespie et al. |
| 6,798,326 | B2 | 9/2004 | Iida |
| 6,922,128 | B2 | 7/2005 | Vilander et al. |
| 7,432,793 | B2 | 10/2008 | Nussbaum |
| 7,872,559 | B2 | 1/2011 | Asano |
| 7,902,953 | B1 | 3/2011 | Watt |
| 8,159,183 | B2 | 4/2012 | Choi et al. |

(Continued)

FOREIGN PATENT DOCUMENTS

| | | |
|---|---|---|
| EP | 0642203 | 7/1994 |
| EP | 0886363 | 12/1998 |

(Continued)

OTHER PUBLICATIONS

Author Unknown, "System Description Wireless Power Transfer," vol. 1: Lower Power, Part 1: Interface Definition, Version 1.1.2, 186 pages, Jun. 2013.

(Continued)

*Primary Examiner* — Richard Tan
(74) *Attorney, Agent, or Firm* — Kilpatrick Townsend & Stockton LLP

(57) ABSTRACT

Methods and apparatuses for improved efficiency of power transfer across an inductive charging interface by selectively activating, deactivating, or modifying one or more of a plurality of transmit coils associated with an inductive power transmitter are disclosed.

28 Claims, 11 Drawing Sheets

(56) References Cited

U.S. PATENT DOCUMENTS

| | | | |
|---|---|---|---|
| 8,338,990 B2* | 12/2012 | Baarman | H01F 38/14 307/104 |
| 8,354,821 B2 | 1/2013 | Cheng et al. | |
| 8,823,238 B2 | 9/2014 | Greaves et al. | |
| 9,209,627 B2 | 12/2015 | Baarman et al. | |
| 2007/0182367 A1* | 8/2007 | Partovi | H01F 5/003 320/108 |
| 2010/0181841 A1* | 7/2010 | Azancot | H01F 38/14 307/104 |
| 2010/0314947 A1* | 12/2010 | Baarman | H02J 5/005 307/104 |
| 2011/0101790 A1* | 5/2011 | Budgett | A61M 1/127 307/104 |
| 2011/0115433 A1* | 5/2011 | Lee | H02J 7/025 320/108 |
| 2012/0098486 A1* | 4/2012 | Jung | H02J 5/005 320/108 |
| 2013/0175872 A1* | 7/2013 | Simon | H02J 5/005 307/104 |
| 2013/0221913 A1* | 8/2013 | Kim | H02J 7/0042 320/108 |
| 2015/0280442 A1 | 10/2015 | Graham | |
| 2015/0303699 A1 | 10/2015 | Wagman et al. | |
| 2015/0348697 A1 | 12/2015 | Graham et al. | |
| 2016/0006288 A1 | 1/2016 | Wagman et al. | |
| 2016/0141884 A1* | 5/2016 | Lee | H02J 17/00 307/104 |

FOREIGN PATENT DOCUMENTS

| | | | |
|---|---|---|---|
| EP | 2161811 | | 3/2010 |
| EP | 2674950 | | 6/2012 |
| KR | 1020130076575 | * | 7/2013 |
| WO | WO92/017929 | | 10/1992 |
| WO | WO98/023020 | | 5/1998 |
| WO | WO2003/096361 | | 11/2003 |
| WO | WO2004/073283 | | 8/2004 |
| WO | WO2005/036569 | | 4/2005 |
| WO | WO2010/129369 | | 11/2010 |

OTHER PUBLICATIONS

Palany, "Power Losses in Litz Wire Used in IPT Applications," Department of Electrical and Computer Engineering, University of Auckland, Aukland, New Zealand, 9 pages, at least as early as May 30, 2014.

* cited by examiner

MULTI-COIL INDUCTION

TECHNICAL FIELD

This disclosure relates to electromagnetic induction power transfer systems, and in particular to systems and methods for distributing inductively coupled coil pairs within the housing of a portable electronic device and an associated inductive power transmitting apparatus.

BACKGROUND

Many portable electronic devices include one or more rechargeable batteries that require external power to recharge from time to time. Such devices may include cell phones, smart phones, tablet computers, laptop computers, wearable devices, navigation devices, sports devices, health devices, medical devices, accessory devices, peripheral input devices, and so on.

Some electronic devices may include an inductive power charging system in lieu of a cable or tethered charging system. In these examples, a user may place the portable electronic device on an inductive power transfer surface ("dock") to replenish a rechargeable battery via electromagnetic induction. In these systems, an electromagnetic coil within the dock ("transmit coil") may inductively couple to an electromagnetic coil within the portable electronic device ("receive coil"). By alternating or switching the current through the transmit coil, current may be induced in the receive coil. The portable electronic device may be adapted to use the received current to replenish the charge of a rechargeable battery.

In many cases, portable electronic devices including an inductive power transfer system may require precise positioning and alignment of the portable electronic device and dock. Imperfect positioning or alignment may substantially reduce power transfer efficiency between the transmit coil and the receive coil. In response to imperfect positioning or alignment, many electronic devices increase the power to the transmit coil to ensure the power received by the receive coil is sufficient to be useful to the portable electronic device.

Low power transfer efficiency may result in an increase in the amount of transmitted power dissipated as heat. As a result, the portable electronic device may experience an increase in temperature. In many cases, heating of a portable electronic device may damage or reduce the operative life of the device and/or its components and enclosure. Furthermore, a heated portable electronic device may be unsafe to use in certain circumstances. For example, excess heat from a portable electronic device may present a fire hazard if placed adjacent to flammable material. In other examples, excess heat from a portable electronic device may be uncomfortable, painful, or injuring if that device is suitable to be transported in a pocket or worn in contact with or adjacent to a user's skin, eyes, or clothing. In such examples, a user may be inconvenienced or frustrated by waiting for the device to cool.

Accordingly, there may be a present need for a system and method for efficiently and rapidly delivering useful power to a portable electronic device while effectively managing the temperature thereof.

SUMMARY

Embodiments described herein may relate to, include, or take the form of methods and apparatuses for managing the efficiency of an inductive power transfer system. Such embodiments can include an inductive power transmitter and an inductive power receiver. The inductive power transmitter and inductive power receiver may each include a plurality of transmit or receive coils positioned in an axially symmetric configuration around a magnetic field source such as a permanent magnet.

A power controller may selectively activate or deactivate one or more of the plurality of transmit or receive coils based on a power transfer efficiency determination. For example, a transmitter may include three transmit coils and a receiver may include three receive coils. In one alignment of the transmitter and receiver, the second coil of the transmitter may transmit power more efficiently to the first coil of the receiver than to the second coil of the receiver. The power controllers of the transmitter and receiver may selectively activate the second coil of the transmitter to transfer power to the first coil of the receiver. In another alignment, other pairings of transmit coils and receive coils may be used.

Other embodiments described herein may relate to or take the form of methods of managing efficiency of power transfer across an inductive power transfer interface, which may include at least the steps of determining the presence of an inductive power receiver, determining an orientation of the detected inductive power receiver, and in response, adjusting output of one or more power-transmitting inductors in response to the determined orientation.

Other embodiments described herein may relate to, include, or take the form of systems and methods for transferring data across an inductive power transfer interface. For example, such embodiments can include an inductive power transmitter and an inductive power receiver. The inductive power transmitter and inductive power receiver may each include a plurality of transmit or receive coils, which may be positioned in an axially symmetric configuration. In certain examples, one or more of the plurality of transmit coils may be selected to provide inductive power to a corresponding one or more of the plurality of receive coils. The power transfer from may be at a first selected frequency.

Continuing the example, one or more of the plurality of transmit coils that is not transmitting power may provide data to a corresponding one or more receive coils that is not receiving inductive power. This data may be transferred at a second selected frequency that is different from the power transfer frequency. In this manner, some of the plurality of transmit coils may transfer data while some of the plurality of transmit coils may transfer power.

Other embodiments described herein may relate to or take the form of methods for managing the temperature of an inductive power transfer interface which may include at least the steps of selecting a first transmit coil from a plurality of transmit coils, connecting the first transmit coil to a power source for a first selected period of time, selecting a second transmit coil from the plurality of transmit coils, and thereafter, connecting the second transmit coil to the power source for a second selected period of time.

BRIEF DESCRIPTION OF THE FIGURES

Reference will now be made to representative embodiments illustrated in the accompanying figures. It should be understood that the following descriptions are not intended to limit the disclosure to one preferred embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Figure 1:
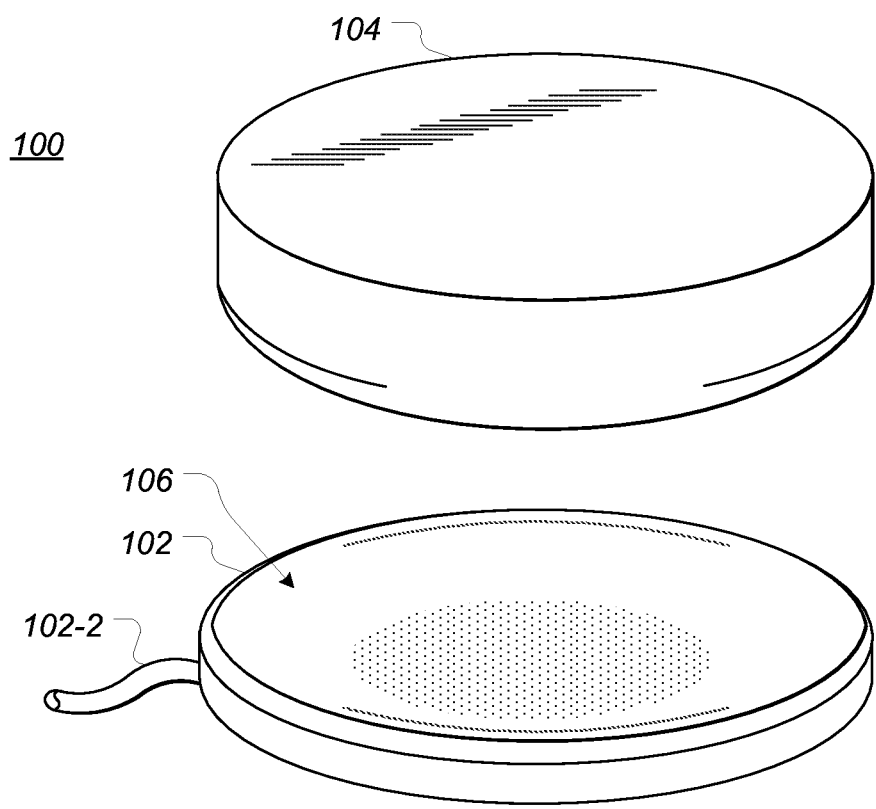
FIG. 1 depicts a top down perspective view of an example inductive power transfer system in an unmated configuration.

Embodiments described herein may relate to or take the form of methods and apparatuses for improved efficiency of power transfer across an inductive power transfer interface. Other embodiments described herein may relate to or take the form of methods and apparatuses for managing the temperature of an inductive power transfer interface.

An inductive power transfer system may include an inductive power transmitting apparatus to transmit power and a portable electronic device or accessory to receive power. Such electronic devices may include media players, media storage devices, personal digital assistants, tablet computers, cellular telephones, laptop computers, smart phones, styluses, global positioning sensor units, remote control devices, wearable devices, electric vehicles, home appliances, medical devices, health devices, sports devices and so on.

In many examples, when a portable electronic device is placed inductively proximate a power-transmitting inductor (i.e., "transmit coil") of an inductive power transmitting apparatus (i.e., "dock" or "charging station"), the portable electronic device may activate inductive power transfer circuitry including a power-receiving inductor (i.e., "receive coil") and may communicate to the inductive power transmitting apparatus that the portable electronic device is ready to receive power. Current may be induced in the receive coil by applying an alternating or switched current to the transmit coil. The portable electronic device may use the received current to replenish the charge of the one or more rechargeable batteries.

In many cases, eddy currents may be induced in any conductor inductively proximate the transmit coil. An eddy current is an electrical current excited in conductive elements in the presence of a time-varying magnetic field. In many cases, circulation of eddy currents may result in joule heating of the conductive elements, which in turn may increase the temperature of the conductive elements and any anything thermally proximate thereto.

For example, during inductive power transfer eddy currents may be induced in conductive components of circuitry (e.g., copper traces, leads, etc.) and/or conductive structural elements (e.g., fasteners, housings, etc.), generally increasing the temperature of the entire portable electronic device. In many cases, heating of an electronic device may damage the electronic device components or housing, reduce the operative life of the device, or render the portable electronic device unsafe or inconvenient to use for a period of time.

Accordingly, embodiments described herein may take the form of power and temperature management systems for use with an inductive power transfer system. In many examples, increasing the efficiency of power transfer across an inductive interface decreases energy lost in the form of heat. In other words, increases in power transfer efficiency may be associated with lower temperature while power is being transferred.

Power and temperature management embodiments may take the form of adaptive power management systems for both a transmitter and receiver of inductive energy. For example, when a portable electronic device is nearby an inductive power transmitter, the inductive power transmitter may activate inductive power transfer circuitry. At all other times, the inductive power transfer circuitry may be completely powered off. In such embodiments, the power transfer circuitry may only draw power when a nearby portable electronic device requires or requests power transfer.

Similarly, inductive power transfer circuitry in the inductive power receiver may be completely powered off when the receiver is not nearby the transmitter. In some examples, inductive power transfer circuitry may be completely disconnected from ground in order to ensure that components of the inductive power transfer circuitry do not draw any power when the components are not in use.

In these examples, the adaptive power management systems may increase power efficiency of both a transmitter and receiver when the inductive power transfer is initiated or terminated.

In still further examples, adaptive power management systems may also operate to increase efficiency during power transfer. For example, the transmit coil may experience an increased load upon coupling to a receive coil. In addition, when the power requirements of the portable electronic device change, the load experienced by the receive coil and the transmit coil may also change. To account for changes in power requirements of various portable electronic devices or different operational modes of a single portable electronic device, the adaptive power management system may include a current monitor. The current monitor may be positioned across a resistor of known resistance.

The output from the current monitor may be used to control a selected operational frequency of the transmit coil. For example, more power may be transferred at lower frequencies than at higher frequencies. Accordingly, if the current monitor determines that the load to the transmit coil has increased, the frequency of the output of the power source may be lowered in order to transmit more power. In the alternative, if the current monitor determines that the loading of the transmit coil has decreased, the frequency of the output of the power source may be raised in order to transmit less power. In these embodiments, the inductive power transfer system may have increased power transfer efficiency by transmitting only the power that is required or requested by the power-receiving device.

An adaptive power management system associated with an inductive power transmitter may also dynamically adjust one or more characteristics of power transmission (e.g., duty cycle, voltage, current, frequency, and the like) to improve efficiency or power of the transfer given the instant power requirements of the inductive power receiver and portable electronic device. In many examples, the reaction of the inductive power transmitter to changes in the power requirements of the inductive power receiver may be somewhat delayed. For example, the inductive power transmitter may receive a communication from the inductive power receiver before increasing or decreasing the power transmitted. These delays may result in an inefficient amount of power to be transferred during the period that the inductive power transmitter is confirming or otherwise discovering the power requirements of the inductive power receiver. For example, the inductive power transmitter may transmit too much or too little power for a period of time before the appropriate characteristics of power transmission may be adjusted.

In some embodiments, communication between the inductive power receiver and the inductive power transmitter may be provided through the inductive power transfer interface, for example by sending a data signal from the receive coil to the transmit coil. The signal applied to the receive coil may induce a current in the transmit coil that can be received and interpreted by the inductive power transmitter. For example, the signal may be sent at via a carrier having a higher frequency than the typical operating frequency of the power transmission of the power transmit coil. For example, inductive power transmission may occur, on average, at 250 kHz and the carrier of the signal may be, on average, several 10 MHz. In other embodiments, other frequencies or frequency differences may be used. Likewise, data transmission may occur in the other direction, such that the signal is sent from a transmit to a receive coil. In some embodiments, the transmitter and receiver may both be configured for sending and receiving one or more signals from the other. In this manner, the inductive power transmitter and the inductive power receiver may communicate across the inductive power transfer interface.

In still further embodiments, an inductive power transmitter and an inductive power receiver may each include a group of transmit and receive coils, respectively. In some embodiments, the group of transmit coils may be arranged in a pattern and the receive coils may be arranged in a mirrored pattern. In this manner, each of the receive coils may align with a respective one of the transmit coils when the receiver is placed on the transmitter in a particular orientation. In some examples, the pattern may be a circular or other axially symmetric pattern.

Continuing the discussion of these embodiments, one or more of the transmit coils may send or receive a data signal to or from a corresponding one or more of the receive coils. For example, two of three transmit coils may be transmit power to a receiver and a third transmit coil may be send or receive data. In another example, more than one coil may be used for sending or receiving data signals. In this manner, both power and data may be transferred at the same time.

In some embodiments, an inductive power transmitter may be configured to detect the alignment of an inductive power receiver and, optionally, to change or adjust communication signals accordingly. For example, an inductive power transmitter may detect whether an inductive power receiver is aligned at a first angle or a second angle with respect to the transmitter and/or a transmit coil. In these embodiments, an inductive power transmitter may be configured to provide inductive power when the receiver is aligned at the first angle and to provide signals when the receiver aligned at the second angle. As one example, if the receiver is rotated or otherwise repositioned on the transmitter, the transmitter (or at least a coil of the transmitter) may switch between an inductive power mode, in which power is transferred between devices, and a communication mode in which data is transferred between devices. Similarly, an inductive power receiver may switch between an inductive power consumption mode and a communication mode.

In these embodiments, an adaptive power management system may include impedance controller. The impedance controller may dynamically adjust the impedance of the inductive power receiver in direct response to changes in the power requirements of the portable electronic device. In these embodiments, the inductive power transmitter may see a substantially continuous load, independent of changes in the inductive power receiver or portable electronic device.

In further embodiments, different properties of the output of the power source may be changed as a result of detected changes in the loading of the transmit coil. For example, the voltage applied to the transmit coil may be increased or decreased in response to increases or decreases in load applied to the transmit coil. An increased efficiency of power transfer may correlate with a decrease in waste heat.

In certain further embodiments, the adaptive power management system may be at least partially controlled or influenced by periodic reports from the portable electronic device itself. For example, a portable electronic device may include a wireless transmitter configured to transmit information to an inductive power transfer system. Such information may include identifying information, authentication information, or power state information. Power state information may include current or future power requirements, time estimations until a rechargeable battery is fully charged, the current charge level of the rechargeable battery, or other power related information. The portable electronic device may send periodic updates, once or more per second. The wireless transmitter may be of any suitable technology such as, for example, Wi-Fi, RF, Bluetooth, near field communication ("NFC"), or infrared. In certain embodiments, the wireless transmitter may be an existing component of the portable electronic device, such as a camera, camera flash, sensor (e.g., heart rate, blood glucose, pulse oximeter, etc.), or a display.

In further embodiments, the inductive power transfer system may use a combination of information received from the portable electronic device and information measured from the current monitor or impedance controller to dynamically, intelligently, and rapidly adjust the power transferred from the transmitter to the receiver. For example, the current monitor may sense an increased load on the transmit coil hundreds of milliseconds before the next update signal is received from the portable electronic device. In such a case, the current monitor may increase the power output immediately and upon confirmation that the power requirements of the portable electronic device have increased at the next signal, retain the newly-determined higher power transmission frequency. In the alternative, if the current monitor senses an increased load that is not confirmed upon receipt of the next signal from the portable electronic device, the power transmission frequency may be re-set to a previous value.

The aforementioned and related embodiments may reduce quantity of heat produced by losses and inefficiencies inherent to an inductive power transfer interface. In this manner, the temperature of the system may be reduced.

Other embodiments described herein may relate to and take the form of methods and systems for managing temperature increases across an inductive power transfer interface. In these cases, heat produced by losses and inefficiencies inherent to the inductive power transfer interface may be effectively and efficiently directed away from the inductive power receiving portion.

FIG. 1 depicts a top down perspective view of an example inductive power transfer system in an unmated configuration. The system 100 may include an inductive power receiver 104 and an inductive power transmitter 102. In the illustrated embodiment, the inductive power transmitter 102 may be connected to mains power (i.e., power outlet) by power cord 102-2. In various implementations and embodiments, the inductive power transmitter 102 and the inductive power receiver 104 included within the housing of electronic devices such as cell phones, smart phones, tablet computers, laptop computers, wearable devices, navigation devices, sports devices, health devices, medical devices, accessory devices, peripheral input devices, and so on.

As shown, the inductive power receiver 104 may include a lower surface that may interface with, align or otherwise contact an interface surface 106 of the inductive power transmitter 102. In this manner, the inductive power receiver 104 and the inductive power transmitter 102 may be positionable with respect to each other. In certain embodiments, the interface surface 106 may be configured in a particular shape that is intended to mate with a complementary shape of the inductive power receiver 104. For example, as illustrated, the interface surface 106 may be formed as a concave shape following a select curve. A bottom surface of the inductive power receiver 104 may be formed as a convex shape following the same or substantially similar select curve as the interface surface 106. In this manner, the inductive power receiver 104 may be shaped to mate with the inductive power transmitter 102 as shown, for example, by FIG. 2.

In other embodiments, the interface surface 106 may take another shape, for example a convex shape or a planar shape. In certain embodiments, the interface surface 106 may be axially symmetric while in others the surface may be axially asymmetric.

Although shown with the inductive power receiver 104 as sized with a horizontal cross section less than that of the inductive power transmitter 102, such a relationship is not required. For example, in certain embodiments, the inductive power receiver 104 may include a horizontal cross section substantially larger than the inductive power transmitter 102. In these examples, the interface area of the inductive power receiver 104 may include an interface surface 106 as only a portion of a bottom surface of the inductive power receiver 104.

Figure 3:
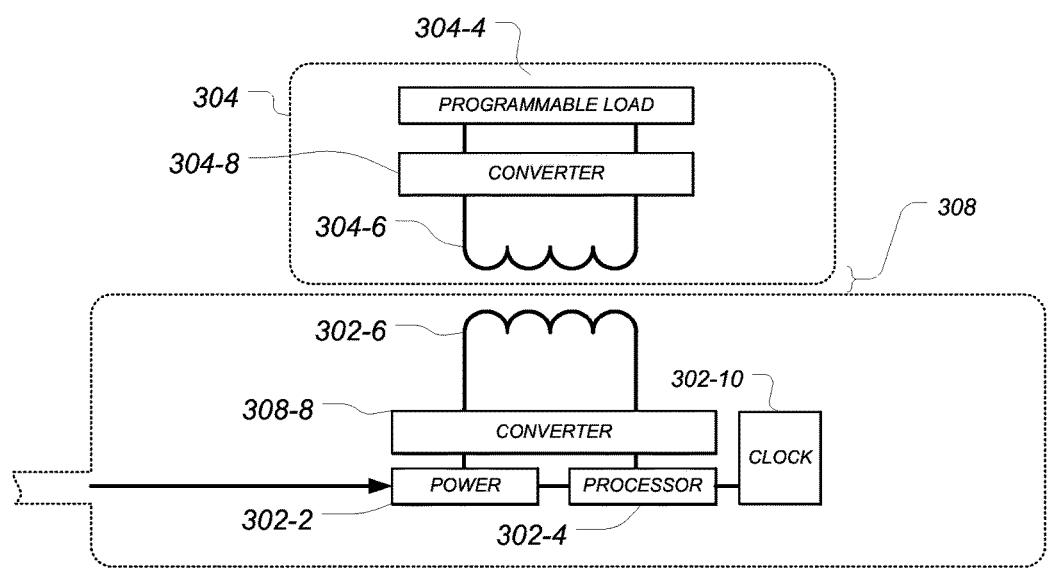
FIG. 3 depicts a simplified signal flow block diagram of a sample inductive power transfer system.

FIG. 3 depicts a simplified signal flow block diagram of an inductive power transfer system. The inductive power transfer system 300 may include an inductive power transmitter 302 and an inductive power receiver 304. In many examples, the inductive power receiver 304 may be positioned on a top surface of the inductive power transmitter 302. In other examples, the inductive power receiver 304 may be positioned on an another surface of the inductive power transmitter 304. The inductive power transmitter 302 and the inductive power receiver 304 may be separated by a gap 308. In many embodiments, the gap 308 may be an air gap and/or may include a portion of one or more housings, such as an enclosure for the transmitter and/or the receiver (examples of which include dock housings and device housing).

The inductive power receiver 304 can be any suitable electronic device, such as a communication device, a health assistant, a smart telephone, or a media player. In some examples, an electronic device may be worn by a user or may be affixed to something worn by a user. For example, an electronic device may be worn on the wrist or, in other examples, an electronic device may clip to a user's clothing. For example, a wearable health assistant can provide health-related information (whether real-time or not) to the user, authorized third parties, and/or to an associated monitoring device.

A wearable health assistant device may be configured to provide health-related information or data such as, but not limited to, heart rate data, blood pressure data, temperature data, oxygen level data, skin conductance data, diet/nutrition information, medical reminders, health-related tips or information, or other health-related data via wireless or wired data connections. For example, the wearable health assistant may communicate with an associated monitoring device via Wi-Fi, Bluetooth, infrared, cellular or any other suitable wireless communication technology. In other examples, the wearable heath assistant may communicate with an associated monitoring device via a tethered data connection. In many examples, the associated monitoring device may be, for example, a tablet computing device, phone, personal digital assistant, computer, and so on.

As another example, a wearable communications device may include a processor coupled with or in communication with a memory, one or more communication interfaces, output devices such as displays and speakers, and one or more input devices. The communication interface(s) can provide electronic communications between the communications device and any external communication network, device or platform, such as but not limited to wireless interfaces, Bluetooth interfaces, USB interfaces, Wi-Fi interfaces, TCP/IP interfaces, RFID interfaces, NFC interfaces, network communications interfaces, and/or any other conventional communication interfaces. The wearable communications device may provide information regarding time, health, statuses or externally connected or communicating devices and/or software executing on such devices, messages, video, operating commands, and so forth (and may receive any of the foregoing from an external device), in addition to communications.

The inductive charging system 300 may include a clock circuit 302-10 operatively connected to a processor 302-4 and a direct current converter 302-8. The clock circuit 302-10 can generate one or more timing signals for the inductive charging system 300.

The processor 302-4 may be coupled to a power supply 302-2. The power supply 302-2 may be a direct current power supply, although this is not necessary. In certain embodiments, the processor 302-4 may control the state of the direct current processor 302-6, which may take power input from the power supply 302-2. In one embodiment, the clock circuit 302-10 generates periodic signals that are used by the processor 302-4 to activate and deactivate switches in the direct current processor 302-8 on a per cycle basis. The switches may convert the direct current from the power supply 302-2 to alternating current suitable for exciting a transmit coil 302-6.

Any suitable direct current processor 302-8 can be used in the inductive charging system 300. For example, in one embodiment, an H bridge may be used as a direct current converter.

In some embodiments, an H bridge may not be required. For example, a single switch may control the flow of current from the direct current processor 302-6. In this manner, the direct current processor 302-8 may function as a square wave generator.

The time-varying signal or square wave signal produced by the direct current processor 302-8 may be input into a transformer. Typically, a transformer such as those used in the above-referenced tethered power transfer systems includes a transmit coil coupled to a receive coil, with each coil wrapped about a common core. However, an inductive charging system 300 as described herein typically includes a transmit coil 302-6 and a receive coil 304-6 separated by a gap 308 and, in some embodiments, the respective housings containing each coil. As illustrated, transformer may not necessarily be a physical element but instead may refer to the relationship and interface between two inductively proximate electromagnetic coils such as a transmit coil 302-6 and a receive coil 304-6.

The foregoing is a simplified description of the transmitter and its interaction with a receive coil 304-6 of an inductive power transfer system. The transmitter may be configured to provide a time-varying voltage to the transmit coil 302-6 in order to induce a voltage in the receive coil 304-6. Although both alternating currents and square waves are used as specific examples, one may appreciate that other waveforms are contemplated. In such a case, the processor 302-4 may control a plurality of states of the direct current processor 302-6. For example, the processor 302-4 may control the voltage, current, duty cycle, waveform, frequency, or any combination thereof.

The processor 302-4 may periodically modify various characteristics of the waveforms applied to the transmit coil 302-6 in order to increase the efficiency of the operation of the power transmitting circuitry. The various modifications may be made in real time, in a predetermined sequence, or may be fixed from time to time. One may appreciate that specific modifications may be desirable for specific circumstances.

For example, in certain cases, the processor 302-4 may discontinue all power to the transmit coil 302-6 if it is determined that the receive coil 304-6 is not be inductively proximate the transmit coil 302-6. This determination may be accomplished in any number of suitable ways. For example, the processor 302-4 may be configured to detect the inductive load on the transmit coil 302-6. If the inductive load falls below a certain selected threshold, the processor 302-4 may conclude that the receive coil 304-6 may not be inductively proximate the transmit coil 302-6 (e.g., close enough to the transmit coil to receive power, or receive power above a threshold). In such a case, the processor 302-4 may discontinue all power to the transmit coil 302-6.

In other cases, in one embodiment the processor 302-4 may set the duty cycle to be at or near a resonance frequency of the transformer. In another example, the period of the waveform defining the active state of the duty cycle (i.e., high) may be selected to be at or near the resonance frequency of the transformer. One may appreciate that such selections may increase the power transfer efficiency between the transmit coil 302-6 and the receive coil 304-6 and, accordingly, decrease thermal losses.

In an alternate example, the processor 302-4 may discontinue all power to the transmit coil 302-6 if a sudden spike in inductive load is sensed. For example, if the inductive load spikes at a particular rate above a certain selected threshold the processor 302-4 may conclude that an intermediate object may be placed inductively proximate the transmit coil 302-6. In such a case, the processor 302-4 may discontinue all power to the transmit coil 302-6. Alternately, such a spike in inductive load may be used as a signal to active inductive charging and thus to power the transmit coil 302-6.

In still further examples, the processor 302-4 may modify other characteristics of the waveforms applied to the transmit coil 302-6. For example, if the receiver circuitry requires additional power, the processor 302-4 may increase the duty cycle of the waveform applied to the transmit coil 302-6. In a related example, if the receiver circuitry requires less power, the processor 302-4 may decrease the duty cycle of the waveform applied to the transmit coil 302-6. In each of these examples, the time average power applied to the transmit coil 302-6 may be modified.

In another example, the processor 302-4 may be configured to modify the amplitude of the waveform applied to the transmit coil 302-6. In such an example, if the receiver circuitry requires additional power, the processor 302-4 may amplify the maximum voltage of the waveform applied to the transmit coil 302-6. In the related case, the maximum voltage of the waveform may be reduced if the receiver circuitry requires less power.

The transmitter 302 of the inductive power transfer system 300 may be configured to provide a time-varying signal to the transmit coil 302-6 in order to induce a voltage in the receive coil 304-6 in the receiver through inductive coupling between the transmit coil 302-6 and the receive coil 304-6. In this manner, power may be transferred from the transmit coil 302-6 to the receive coil 304-6 through the creation of a varying magnetic flux by the time-varying signal in the transmit coil 302-6.

The time-varying signal produced in the receive coil 304-6 may be received by a direct current converter 304-6 that converts the time-varying signal into a direct current signal. Any suitable direct current converter 304-6 can be used in the inductive charging system 300. For example, in one embodiment, a rectifier may be used as a direct current converter. The direct current signal may then be received by a programmable load 304-4.

In some embodiments, the receiver direct current converter 304-6 may be a half bridge. In such examples, the receive coil 304-6 may have an increased number of windings. For example, in some embodiments, the receive coil may have twice as many windings. In this manner the induced voltage across the receive coil 304-6 may be reduced by half, effectively, by the half bridge rectifier. In certain cases, this configuration may require substantially fewer electronic components. For example, a half bridge rectifier may require half as many transistors as a full wave bridge rectifier. As a result of fewer electronic components, resistive losses may be substantially reduced.

In certain other embodiments, the receiver may also include circuitry to tune out or reduce magnetizing inductance present in the transmitter. Generally, magnetizing inductance may result in losses in a transformer formed by imperfectly coupled coils. This magnetizing inductance, among other leakage inductance, may substantially reduce the efficiency of the transmitter. Further, because magnetizing inductance is a function of the coupling between a transmit and receive coil, it cannot be mitigated exclusively within the transmitter. Accordingly, in certain embodiments discussed herein, tuning circuitry may be included within the receiver. For example, in certain embodiments, a capacitor may be positioned parallel to the programmable load 304-4.

In still further examples, a combination of the above-referenced sample modifications may be made by the processor. For example, the processor 302-4 may double the voltage in addition to reducing the duty cycle. In another example, the processor may increase the voltage over time, while decreasing the duty cycle over time. One may appreciate that any number of suitable combinations are contemplated herein.

Figure 2:
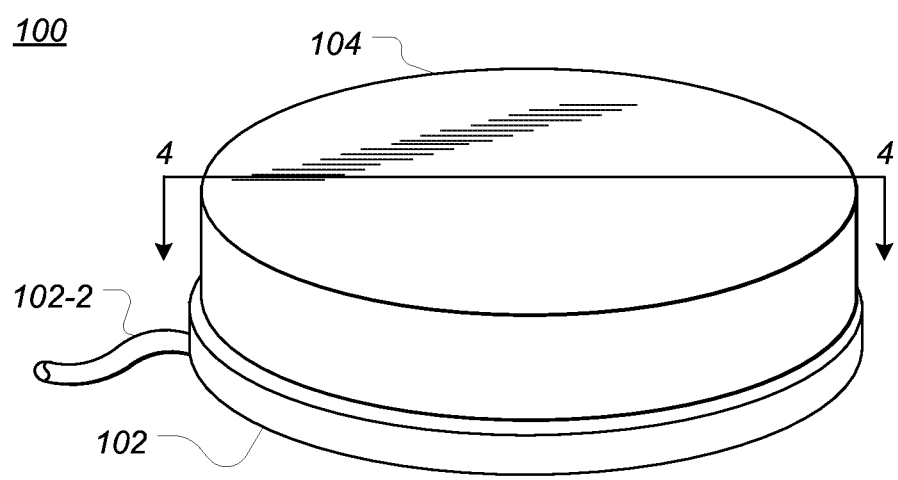
FIG. 2 depicts the example inductive power transfer system of FIG. 1 in a mated configuration.
Figure 4:
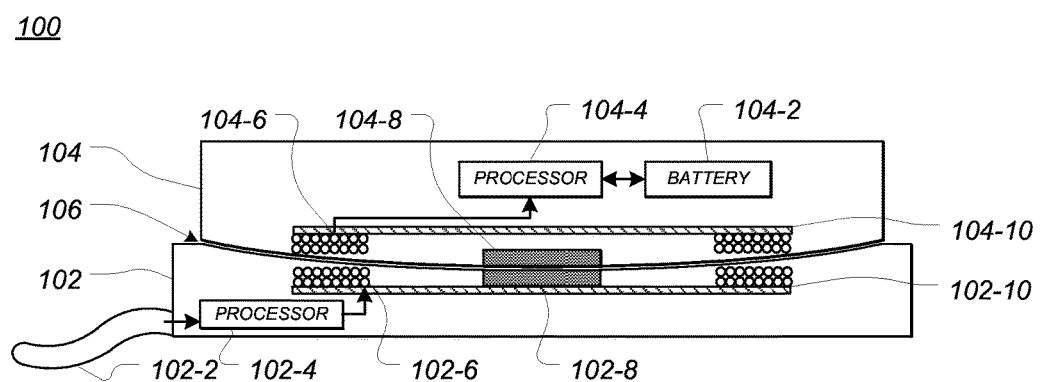
FIG. 4 depicts a side cross section view of the example inductive power transfer system taken along line 4-4 of FIG. 2.

FIG. 4 depicts a side cross section view of the example inductive power transfer system taken along line 4-4 of FIG. 2 including a simplified block diagram of an inductive power-receiving apparatus and a simplified block diagram of an inductive power-transmitting apparatus. As illustrated, the inductive power receiver 104 may include one or more receive coils 104-6. As shown, the receive coil 104-6 has two layers of eight turns each for a total of sixteen turns. However, any appropriate number or configuration of turns may be desirable from embodiment to embodiment. In some embodiments, the receive coil 104-6 may have a tilted or semi-conical shape, or a curved surface, to follow a curvature of the housing of the inductive power receiver 104.

The inductive power receiver 104 may also include processor 104-4. The processor 104-4 may be coupled to or more transitory or non-transitory storage media, and a battery 104-2. The storage media may include, but may not necessarily be limited to, magnetic storage, optical storage, magneto-optical storage, read only memory, random access memory, erasable program memory, flash memory, and so on. The battery 104-2 may include, but may not necessarily be limited to a battery power source, a capacitive power source, or a combination thereof.

The processor 104-4 may execute one or more instructions stored in the storage medium 112 in order to perform one or more device operations of the inductive power receiver 104. The instructions may be executed sequentially.

The processor 104-4 may also be coupled to one or more sensors. For example, a temperature sensor and may be operably connected to the battery 104-2 or the processor 104-4 such that, if a select temperature threshold is reached, the processor 104-4 may selectively disable one or more components or processes.

In many examples, the receive coil 104-6 may be made from a plurality of individual receive coils 104-6. The individual receive coils may be stacked, layered, or distributed adjacent to one other. In these examples, individual receive coils may be configured for individual or simultaneous operation, or both. For example, a first receive coil 104-6 may operate for a period of time after which a second receive coil 104-6 is operated. In another example, more than one receive coil may operate at the same time. In many cases, the selection of a receive coil 104-6 to operate at a particular time may be made, at least in part, upon a power efficiency measurement from the processor 104-4. For example, the processor 104-4 may determine that a first receive coil is operating at a theoretical peak efficiency and a second receive coil is operating lower than theoretical peak efficiency. In such a case, the processor 104-4 may select the first receive coil to continue receiving power and may disable the second receive coil. In this manner, the processor 104-4 may increase the overall power transfer efficiency of the inductive power transfer system 100 by disabling inefficient power transfer paths.

Similarly, the inductive power transmitter 102 may also include processor 102-4, one or more transitory or non-transitory storage media, and a power source 102-2. The storage media may include, but may not necessarily be limited to, magnetic storage, optical storage, magneto-optical storage, read only memory, random access memory, erasable program memory, flash memory, and so on. The power source 102-2 may include, but may not necessarily be limited to a battery power source, a capacitive power source, or a combination thereof. In many examples, the power source 102-2 may be a cable connection to mains (i.e., outlet) power.

The inductive power transmitter 102 may also include transmit coil 102-6. As shown, the transmit coil 102-6 has two layers of eight turns each for a total of sixteen turns. In other embodiments, different numbers of layers and turns may be used. For example, a transmit coil may include four turns in three layers each for a total of twelve turns and the receive coil may include six turns in four layers for a total of twenty four turns. However any appropriate number or configuration of turns may be desirable from embodiment to embodiment. In many embodiments, the transmit coil 102-6 may have a tilted or semi-conical shape to follow a curvature of the housing of the inductive power transmitter 102.

In many examples, the transmit coil 102-6 may likewise be made from a plurality of individual transmit coils 102-6 that are sized and positioned to align with a plurality of individual receive coils 104-6 that may be formed within the inductive power receiver 104. The individual transmit coils may be stacked, layered, or distributed adjacent to one other. In these examples, individual transmit coils may be configured for individual or simultaneous operation, or both. For example, a first transmit coil 102-6 may operate for a period of time after which a second transmit coil 102-6 is operated. In another example, more than one transmit coil may operate at the same time. In many cases, the selection of a transmit coil 102-6 to operate at a particular time may be made, at least in part, upon a power efficiency measurement from the processor 102-4. For example, the processor 102-4 may determine that a first transmit coil is operating at a theoretical peak efficiency and a second transmit coil is operating lower than theoretical peak efficiency. In such a case, the processor 102-4 may select the first transmit coil to continue transmitting power and may disable the second transmit coil. In this manner, the processor 102-4 may increase the overall power transfer efficiency of the inductive power transfer system 100 by disabling inefficient power transfer paths.

The inductive power transmitter 102 may also include an interface area 106 that takes a substantially curved shape. For example, as illustrated, the interface surface 106 may be in intended concave shape following a select curve. In other embodiments, the interface surface 106 may take another shape, for example a convex shape. In still further embodiments, the interface surface 106 may take the form of an axially symmetric shape. For example, when the inductive power receiver 104 and the inductive power transmitter 102 are placed adjacent to one another, the shape of the interface area 106 may encourage the alignment shown in FIG. 2.

In some implementations, one or more of the surfaces of the inductive power receiver 104 and the inductive power transmitter 102 may be formed or otherwise coated with a low friction material. In still further embodiments, inductive power receiver 104 and the inductive power transmitter 102 may be correspondingly shaped to minimize the friction coefficients (e.g., a static coefficient of friction and/or kinetic coefficient of friction) between the two interfacing surfaces.

To prevent the development of eddy currents within the interface area 106, the interface area 106 may be constructed of a material that is thermally conductive and substantially electrically insulating.

In many embodiments, each of the transmit and receive coils 102-6, 104-6 may be enclosed by an electromagnetic shield element 102-10, 104-10 respectively. The electromagnetic shield elements 102-10, 104-10 may be made from any material suited for electromagnetic shielding.

For example, in certain embodiments, the electromagnetic shield elements 102-10, 104-10 may be at least partially formed of a crystalline alloy, such as crystalline iron silicon. In this manner, the electromagnetic shield elements 102-10, 104-10 may at least partially redirect electrical flux associated with the transmit and receive coils 102-6, 104-6 toward the interface between the inductive power receiver 104 and the inductive power transmitter 102. As a result of this at least partially redirected flux, the material and size transmit and receive coils 102-6, 104-6 selected may be small, providing an equivalent inductive power transfer to a larger or unshielded pair of transmit and receive coils. Thus, the flux that might have otherwise radiated and dissipated outwardly from the transmit coil 104-6 may be redirected and substantially or entirely within the receive coil 102-6. In this manner, the power received at the receive coil 102-6 may be greater than an embodiment excluding the electromagnetic shield elements 102-10, 104-10.

As illustrated, the inductive power receiver 104 and the inductive power transmitter 102 may correspondingly each include an alignment magnet 104-8 and 102-8 respectively. The alignment magnets 102-8, 104-8 are generally placed and/or aligned to attract one another. In this manner, the magnetic attraction between the alignment magnets 102-8, 104-8 may facilitate, encourage, or otherwise ease achievement of the alignment position shown in FIG. 2, with the inductive power receiver 104 substantially centered on the upper surface of the inductive transmitter 102 and the indicative charging coils of both device and charger substantially aligned. In this manner, the alignment magnets may define an alignment axis for the inductive power receiver 104.

The size and shape of the alignment magnets 102-8 and 104-8 may vary from embodiment to embodiment. In certain embodiments, the alignment magnets 102-8, 104-8 may take a substantially cylindrical shape. In these examples, the alignment magnets 102-8, 104-8 may encourage proper alignment of the inductive power receiver 104 with the inductive power transmitter 102 regardless the direction, orientation, or position the user desires. In such embodiments, a user may benefit from the convenience of axial symmetry. In many examples, a larger the cross section of the alignment magnets 102-8, 104-8 may result in a stronger connection and alignment effect. However, it may be appreciated that eddy currents may develop in the alignment magnets 102-8, 104-8 the closer the alignment magnets 102-8, 104-8 reach to the inner diameter of the transmit and receive coils 102-6, 104-6. In some examples, the shape, size, and position of the alignment magnets may be selected specifically to reduce eddy currents. In alternate embodiments, the size and position of the transmit and receive coils 102-6, 104-6 may be selected specifically to reduce eddy currents within the alignment magnets.

Figure 5:
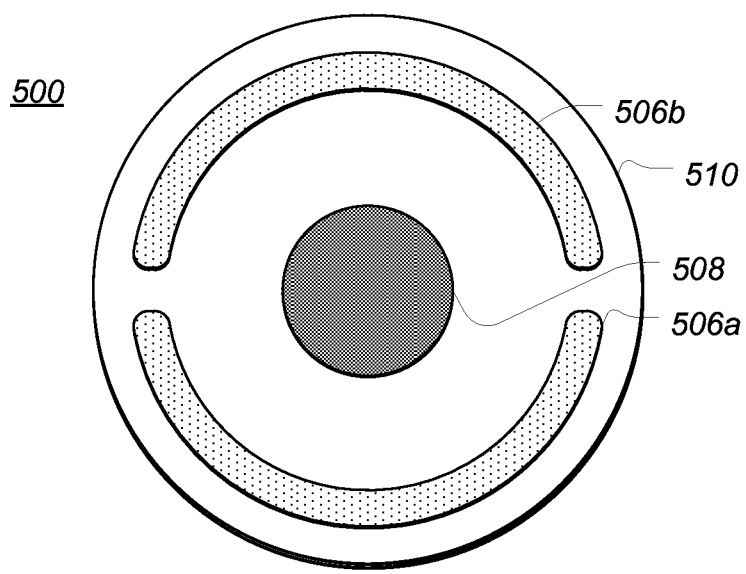
FIG. 5 depicts a top plan view of a portion of an example inductive power transfer system, showing one example configuration of a plurality of power transfer inductors.

FIG. 5 depicts a top plan view of a portion of an example inductive power transfer system 500, showing one example configuration of a plurality of power transfer inductors. As illustrated, two independent inductive power transfer coils 506a, 506b may be placed on or adjacent to an electromagnetic shield element 510 and positioned concentrically about a central alignment magnet 508. The power transfer coils 506a, 506b may take a substantially arcuate shape. In such an embodiment, the portion of the example inductive power transfer system 500 may be included within a transmitter or a receiver associated with an inductive power transfer system. In many embodiments, both an inductive power transmitter and an inductive power receiver may include a coil configuration as shown. In these examples, when an inductive power receiver is placed nearby an inductive power transmitter such that corresponding alignment magnets 508 attract one another, power may be transferred from and between either or both inductive power transfer coils 506a, 506b.

A processor coupled to the inductive power transfer coils 506a, 506b may determine that power transfer through power transfer coil 506a is less efficient than power transfer through power transfer coil 506b. In such an example, the processor may disable power transfer coil 506b in favor of operating power transfer coil 506a on its own. In another example, the processor may alternate enabling transfer coil 506a and transfer coil 506b. In certain examples, the rate of alteration may be based at least in part on a power efficiency determination made by the processor. For example, an inductive power receive may be oriented or positioned along the axis defined by the alignment magnet 508, rotated in such a manner such that the transfer coil 506a transfers power more efficiently than the transfer coil 506b. The processor may enable the transfer coil 506a for a longer period than the transfer coil 506b.

In other examples, the processor may alternate equally between several transfer coils in order to regulate or otherwise control the generation of heat. For example, transfer coil 506a may be operated for a period of time and may generate a certain amount of heat, localized to an area nearby the transfer coil 506a. Subsequently, the processor may disable the transfer coil 506a in favor of transfer coil 506b. In such an example, the hot spot generated as a result of the operation of the transfer coil 506a may cool. In these examples, the processor may intelligently regulate the temperature of the inductive power transfer system 500.

Figure 6:
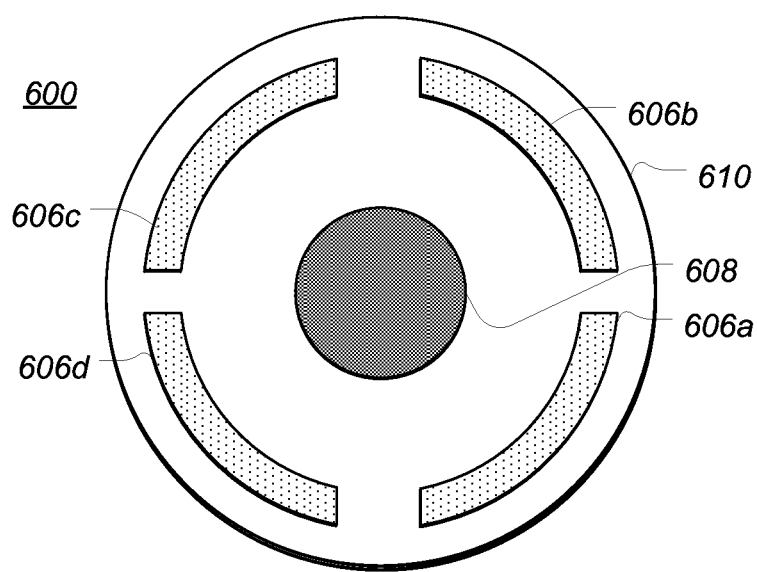
FIG. 6 depicts a top plan view of a portion of an example inductive power transfer system, showing another example configuration of a plurality of power transfer inductors.

FIG. 6 depicts a top plan view of a portion of an example inductive power transfer system, showing another example configuration of a plurality of power transfer inductors. Similar to FIG. 5, the inductive power transfer system 600 may include a plurality of inductive power transfer coils 606a-d, which may take a substantially arcuate shape. As illustrated, four inductive power transfer coils may be included. As with the embodiment illustrated in FIG. 5, the inductive power transfer system 600 may be coupled to a processor that may periodically switch between the several power transfer coils 606a, 606b, 606c, and 606d. The switching between the power transfer coils may be based upon an efficiency determination, temperature dissipation objectives, or any other suitable basis.

Figure 7:
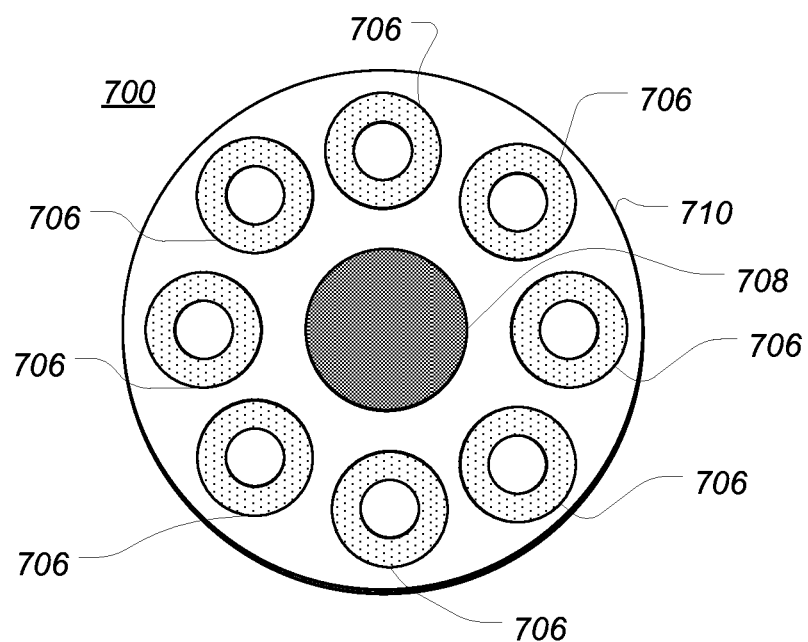
FIG. 7 depicts a top plan view of a portion of an example inductive power transfer system, showing another example configuration of a plurality of power transfer inductors.

FIG. 7 depicts a top plan view of a portion of an example inductive power transfer system, showing another example configuration of a plurality of power transfer inductors. Similar to FIGS. 5-6, the inductive power transfer system 700 may include a plurality of inductive power transfer coils 706, which may take a substantially circular shape. As illustrated, eight inductive power transfer coils may be included. As with the embodiment illustrated in FIG. 5, the inductive power transfer system 700 may be coupled to a processor that may periodically switch between the several power transfer coils 706. The switching between the power transfer coils may be based upon an efficiency determination, temperature dissipation objectives, or any other suitable basis.

Figure 8:
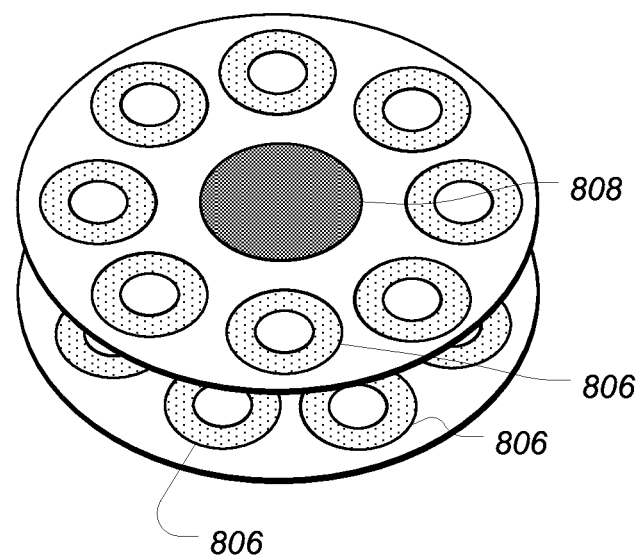
FIG. 8 depicts a top plan view of a portion of an example inductive power transfer system having multiple layers, showing another example configuration of a plurality of power transfer inductors.

FIG. 8 depicts a top plan view of a portion of an example inductive power transfer system having multiple layers, showing another example configuration of a plurality of power transfer inductors. Similar to FIGS. 5-7, the inductive power transfer system 800 may include a plurality of inductive power transfer coils 806, which may take a substantially circular shape. As illustrated, eight inductive power transfer coils may be included in a first layer and eight inductive power transfer coils may be included in a second layer. The second layer may be angularly offset with respect to the first layer. As with the embodiment illustrated in FIG. 5, the inductive power transfer system 800 may be coupled to a processor that may periodically switch between the several power transfer coils 806. The switching between the power transfer coils may be based upon an efficiency determination, temperature dissipation objectives, or any other suitable basis.

Although shown as taking a circular shape and having the same diameter, certain embodiments may include power transfer coils of different shapes and different sizes. For example, one embodiment may include four power transfer coils of a first diameter and four power transfer coils of a second diameter. In other embodiments, different layers may include different sized power transfer coils. In still further embodiments more than two layers may be used.

Figure 9:
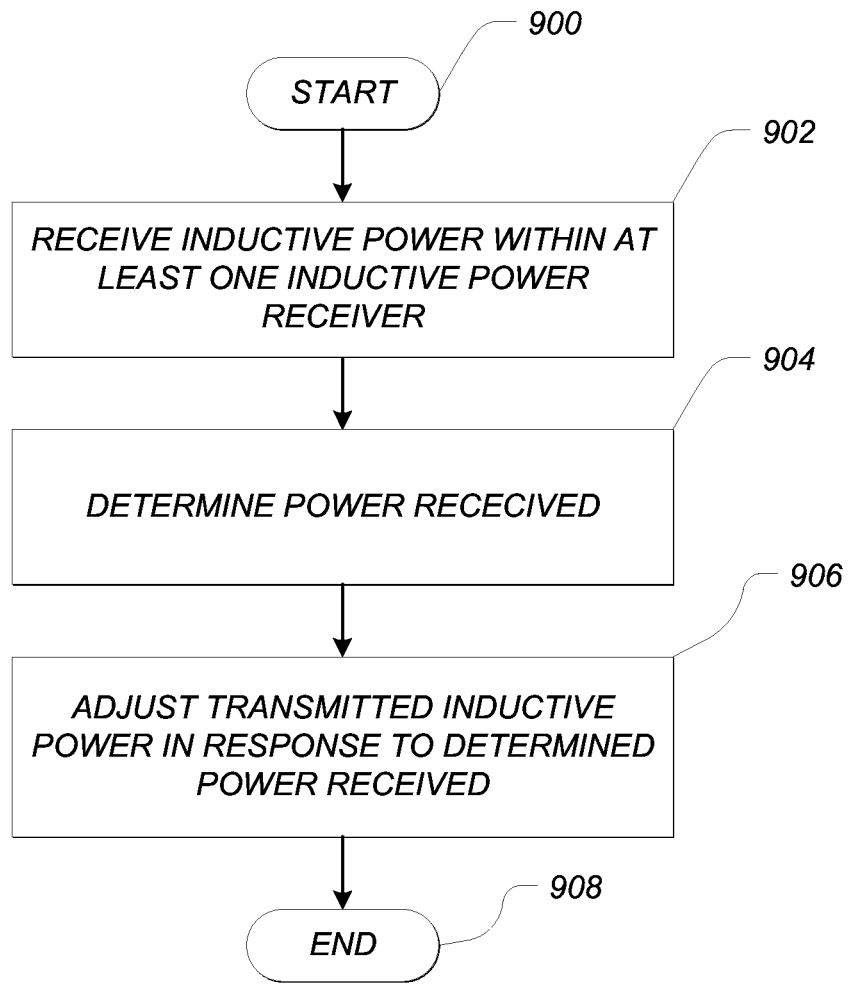
FIG. 9 depicts a process flow diagram of the example steps of one method of controlling the transmit power of an inductive power transfer system.

FIG. 9 depicts a process flow diagram of the example steps of one method of controlling the transmit power of an inductive power transfer system. The method may begin at step 900 after which inductive power may be received within at least one inductive power receiver at step 902. For example, the inductive power receiver may be a receive coil. After inductive power is received at 902, the received power may be measured at step 904. For example, the received power may be measured by a processor coupled to the inductive power receiver. In another example, the received power may be measured by a processor coupled to an inductive power transmitter. Thereafter, at step 906, the transmitted inductive power may be adjusted in response to the measured inductive power received. In this manner, power efficiency may be measured and adjusted. The method may terminate at step 908.

The method of FIG. 9 may be operated by a processor coupled to a plurality of individual inductive power transferring coils. In one example, the processor may operate the method to determine the power efficiency and power transfer efficiency of a particular power transferring coil. After the efficiency of an individual coil is determined, the processor may selectively deactivate the coil if the coil is not transferring power at or above the desired efficiency. In other examples, the processor may selectively increase or augment the power transferred through the coil to optimize the efficiency of power transfer.

Figure 10:
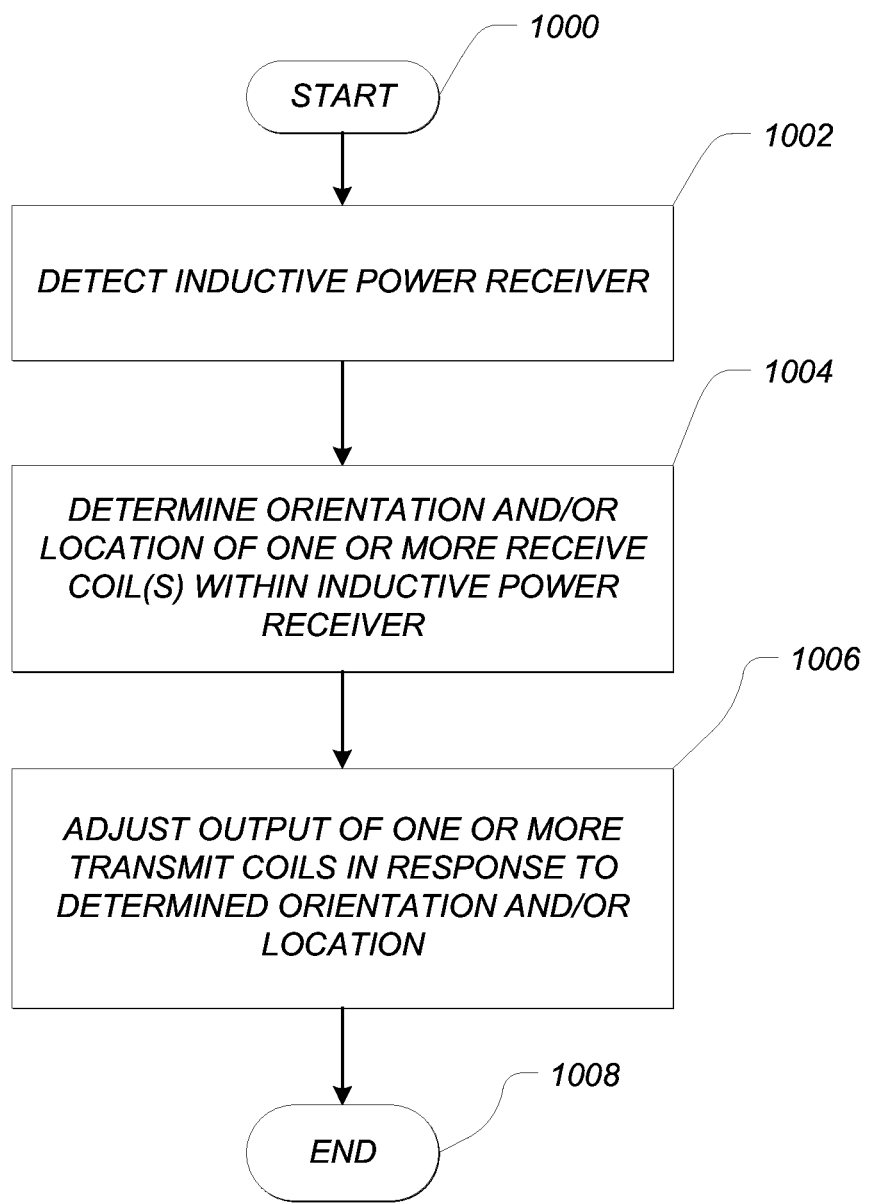
FIG. 10 depicts a process flow diagram of the example steps of one method of controlling the transmit power of an inductive power transfer system.

FIG. 10 depicts a process flow diagram of the example steps of one method of controlling the transmit power of an inductive power transfer system. The method may begin at step 1000 after which an inductive power receiver is detected at step 1002. Detection of an inductive power receiver may be accomplished using any number of suitable methods or means. For example, in one embodiment, a Hall Effect sensor may be positioned adjacent to the alignment magnet of an inductive power receiver. When the alignment magnet of the inductive power receiver is nearby the Hall Effect sensor, the sensor may determine that the inductive power receiver is present. In other examples, other sensors or switches may be used.

After an inductive power receiver is detected, the method may continue at step 1004 to determine the orientation and or location of one or more receive coils within the inductive power receiver. For example, the inductive power receiver may include one or more orientation sensors that can report or otherwise communicate an orientation of the device and, accordingly, the position and orientation of any receive coils included therein.

After the orientation, location or position of one or more receive coils is determined, the method may continue at 1006 to adjust the output of one or more transmit coils in response to the determine orientation, location, or position of the one or more receive coils. The method may conclude at 1008.

The method of FIG. 10 may be operated by a processor coupled to a plurality of individual inductive power transferring coils. In one example, the processor may operate to determine which transmit coil should have the greatest power transfer efficiency to a corresponding receive coil within an inductive power receiving device based on a determined orientation of the device. For example, a first transmit coil of a power transfer apparatus may be aligned with a first receive coil in a first orientation, but may be aligned with a second receive coil in a second orientation. The processor may determine that the first transmit coil is not the best candidate to transmit power to the first receive coil, and may adjust transmitted power accordingly.

Figure 11:
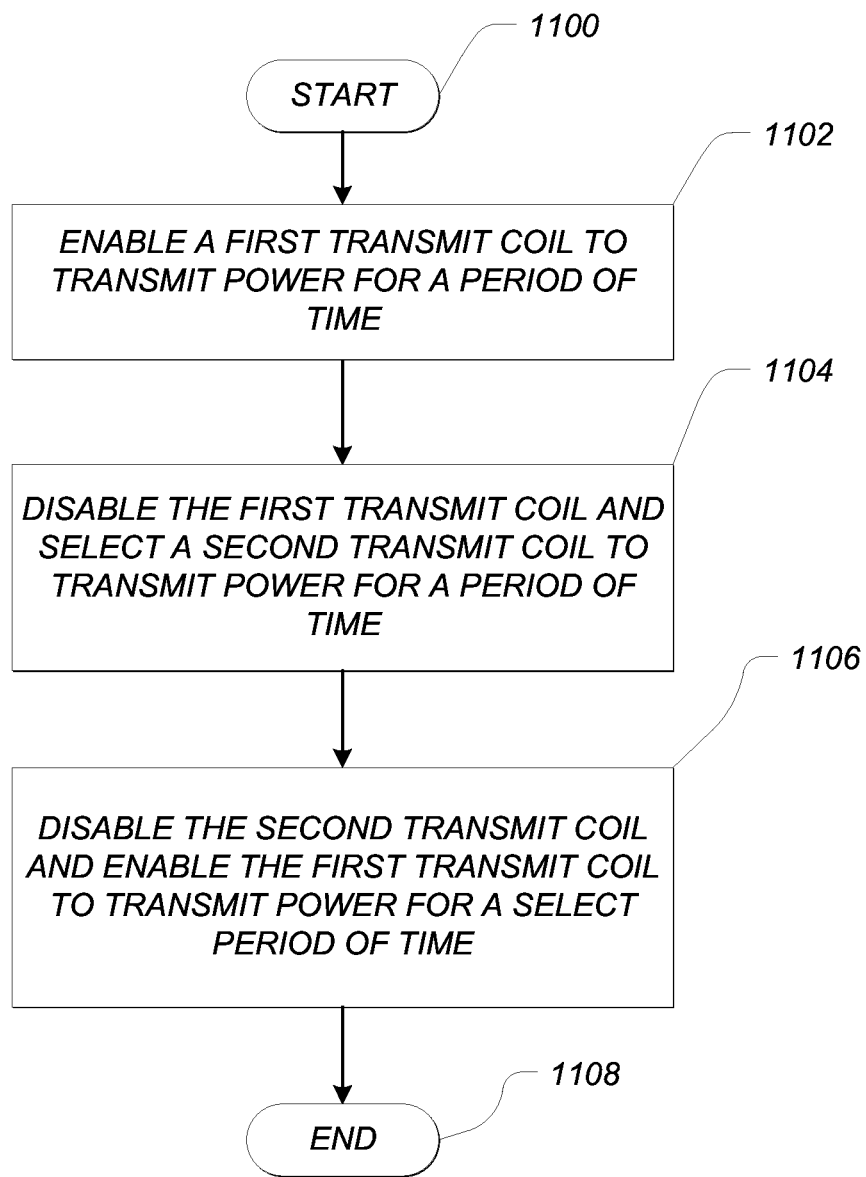
FIG. 11 depicts a process flow diagram of the example steps of one method of controlling the temperature of an inductive power transfer system.

FIG. 11 depicts a process flow diagram of the example steps of one method of controlling the temperature of an inductive power transfer system. The method may begin at step 1100, after which a first transmit coil may be enabled to transmit power for a select period of time at 1102. Thereafter the first transmit coil may be disabled and a second coil may be enabled for another select period of time at 1104. Thereafter, the first transmit coil may once again be activated, after deactivating the second transmit coil at step 1106. The method may conclude at 1108.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. An adaptive power control system for an electromagnetic induction power transfer apparatus comprising:
   an inductive power transmitter, comprising:
   a first magnetic field source;

a power supply configured to switch between an active state and an inactive state at a selectable duty cycle;

a plurality of independently operable power-transmitting inductors coupled to the power supply and positioned around the first magnetic field source at axially symmetric intervals and in a non-concentric and non-overlapping arrangement with respect to each inductor of the plurality of independently operable power-transmitting inductors themselves and the first magnetic field source;

a processor operatively connected to the power supply and configured to vary a power transmitted by the plurality of independently operable power-transmitting inductors in response to an indication of a programmable load, wherein the processor is further configured to disable a first independently operable power-transmitting inductor while maintaining an operation of a second independently operable power-transmitting inductor once the first independently operable power-transmitting inductor generates a certain amount of heat.

2. The adaptive power control system of claim 1, the inductive power transmitter further comprising a power controller coupled to each of the plurality of power-transmitting inductors.

3. The adaptive power control system of claim 2, wherein the power controller is configured to electrically couple the power supply to a selected subset of the plurality of power-transmitting inductors.

4. The adaptive power control system of claim 2, wherein the power controller is configured to determine a power transfer efficiency for each of the plurality of power-transmitting inductors.

5. The adaptive power control system of claim 4, wherein the power controller is configured to electrically couple the power supply to a selected subset of the plurality of power-transmitting inductors, wherein the selected subset is determined to have a highest power transfer efficiency of the plurality of power-transmitting inductors.

6. The adaptive power control system of claim 1, wherein the first magnetic field source comprises a permanent magnet.

7. The adaptive power control system of claim 1, wherein the plurality of power-transmitting inductors are positioned in a circular pattern surrounding the first magnetic field source.

8. The adaptive power control system of claim 1, wherein the plurality of power-transmitting inductors are arranged in a plurality of layers.

9. The adaptive power control system of claim 1, wherein the plurality of power-transmitting inductors are arranged in a set of layers offset from one another.

10. The adaptive power control system of claim 1, further comprising an inductive power receiver comprising:

a second magnetic field source configured to be attracted to the first magnetic field source;

a plurality of power-receiving inductors positioned around the second magnetic field source, each positioned inductively proximate a corresponding one of the plurality of power-transmitting inductors; and the programmable load.

11. The adaptive power control system of claim 10, further comprising a power controller coupled to each of the plurality of power-transmitting inductors, wherein the power controller is configured to electrically couple a selected subset of the plurality of power-receiving inductors to at least one a rechargeable battery and the programmable load.

12. The adaptive power control system of claim 11, wherein the power controller is configured to determine a power transfer efficiency for each of the plurality of power-receiving inductors.

13. The adaptive power control system of claim 12, wherein the power controller is configured to electrically couple a selected subset of the plurality of power-receiving inductors to at least one a rechargeable battery and the programmable load, wherein the selected subset is determined to have a higher power transfer efficiency than each unselected power-receiving inductor of the plurality of power-receiving inductors.

14. The adaptive power control system of claim 1, wherein at least one of the plurality of power-transmitting inductors coupled to a signal generator.

15. The adaptive power control system of claim 14, wherein the signal generator is adapted to apply a first signal to the at least one of the plurality of power-transmitting inductors the first signal provided at a higher frequency than an operating frequency of the selectable duty cycle.

16. An electromagnetic induction power receiver comprising:

a magnetic field source configured to be attracted to an electromagnetic induction power transmitter;

a plurality of independently operable power-receiving inductors positioned around the magnetic field source at axially symmetric intervals and in a non-concentric arrangement with respect to each inductor of the plurality of independently operable power-receiving inductors themselves and the first magnetic field source, each positioned inductively proximate a corresponding one of a plurality of power-transmitting inductors;

a processor configured to disable a first independently operable power-receiving inductor while maintaining an operation of a second independently operable power-receiving inductor if a temperature of the first independently operable power-receiving inductor reaches a temperature threshold; and a programmable load.

17. The electromagnetic induction power receiver of claim 16, wherein the magnetic field source comprises a permanent magnet.

18. The electromagnetic induction power receiver of claim 16, wherein the plurality of independently operable power-receiving inductors are arranged in a plurality of layers.

19. The electromagnetic induction power receiver of claim 17, further comprising a power controller coupled to each of the plurality of power-receiving inductors.

20. The electromagnetic induction power receiver of claim 19, wherein the power controller is configured to electrically couple a selected subset of the plurality of power-receiving inductors to at least one a rechargeable battery and the programmable load.

21. The electromagnetic induction power receiver of claim 19, wherein the power controller is configured to determine a power transfer efficiency for each of the plurality of power-receiving inductors.

22. The electromagnetic induction power receiver of claim 21, wherein the power controller is configured to electrically couple a selected subset of the plurality of power-receiving inductors to at least one a rechargeable battery and the programmable load, wherein the selected subset is determined to have a higher power transfer efficiency than each of the unselected power-receiving inductors of the plurality of power-receiving inductors.

23. A method of modifying power output of an electromagnetic induction power transfer apparatus having a plurality of independently operable transmitter coils positioned around a centrally located alignment magnet at axially symmetrical intervals and in a non-concentric and non-overlapping arrangement comprising:
  determining a presence of an inductive power receiver;
  determining a location and an orientation of the inductive power receiver; and
  adjusting output of one or more of the plurality of independently operable transmitter coils positioned at the axially symmetrical intervals around the alignment magnet in response to the determined location and orientation of the inductive power receiver.

24. A method of managing temperature of an electromagnetic induction power transfer apparatus comprising:
  operating a plurality of transmit coils to perform power transfer to an electronic device, the plurality of transmit coils including a first transmit coil and a second transmit coil;
  selecting the first transmit coil from the plurality of transmit coils based upon a temperature generated by the first transmit coil;
  disabling the first transmit coil for a first selected period of time to cool the first transmit coil while enabling the second transmit coil to continue performing power transfer to the electronic device;
  selecting the second transmit coil from the plurality of transmit coils upon a temperature generated by the second transmit coil; and
  disabling the second transmit coil for a second selected period of time to cool the second transmit coil while enabling the first transmit coil to continue performing power transfer to the electronic device.

25. The method of claim 24, wherein the first selected period of time is based at least in part on a temperature of the electromagnetic induction power transfer apparatus.

26. The method of claim 24, wherein the second transmit coil is selected, at least in part, on the second transmit coil's distance from the first transmit coil.

27. The adaptive power control system of claim 1, wherein the plurality of independently operable power-transmitting inductors are disposed around a periphery of the first magnetic field source, and wherein each individual inductor in the plurality of power-transmitting inductors is positioned around the first magnetic field source at equally spaced intervals such that the plurality of power-transmitting inductors are axially symmetric with respect to the first magnetic field source.

28. The adaptive power control system of claim 10, wherein the second magnetic field source comprises a permanent magnet.

* * * * *